United States Patent
Lee et al.

(10) Patent No.: US 8,334,246 B2
(45) Date of Patent: Dec. 18, 2012

(54) COMPOSITION FOR STRIPPING COLOR FILTER AND REGENERATION METHOD OF COLOR FILTER USING THE SAME

(75) Inventors: Kwang-Ho Lee, Seoul (KR); Jang-Sub Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 374 days.

(21) Appl. No.: 12/694,014

(22) Filed: Jan. 26, 2010

(65) Prior Publication Data

US 2011/0041876 A1 Feb. 24, 2011

(30) Foreign Application Priority Data

Aug. 18, 2009 (KR) .................. 10-2009-0076403

(51) Int. Cl.
*G02B 5/20* (2006.01)

(52) U.S. Cl. .................. 510/109; 349/106; 430/7

(58) Field of Classification Search .............. 349/106; 510/109; 430/7
See application file for complete search history.

(56) References Cited

U.S. PATENT DOCUMENTS

| | | | | |
|---|---|---|---|---|
| 6,630,274 B1 * | 10/2003 | Kiguchi et al. | ........... | 430/7 |
| 6,806,925 B2 * | 10/2004 | Ishii et al. | ........... | 349/106 |
| 7,006,172 B2 * | 2/2006 | Kawana et al. | ........... | 349/71 |
| 7,070,890 B2 * | 7/2006 | Kiguchi et al. | ........... | 430/7 |
| 7,514,187 B2 * | 4/2009 | Kiguchi et al. | ........... | 430/7 |
| 7,830,472 B2 * | 11/2010 | Kawana et al. | ........... | 349/61 |
| 7,948,585 B2 * | 5/2011 | Ohtani et al. | ........... | 349/108 |
| 8,040,470 B2 * | 10/2011 | Kashiwagi | ........... | 349/106 |
| 2004/0038138 A1 * | 2/2004 | Kiguchi et al. | ........... | 430/7 |
| 2006/0216617 A1 * | 9/2006 | Kiguchi et al. | ........... | 430/7 |
| 2007/0078072 A1 | 4/2007 | Yokoi et al. | | |
| 2007/0160776 A1 * | 7/2007 | Kwon et al. | ........... | 428/1.1 |
| 2007/0225188 A1 | 9/2007 | Wang | | |
| 2009/0073356 A1 * | 3/2009 | Moriyama et al. | ........... | 349/106 |
| 2009/0114888 A1 * | 5/2009 | Nishida et al. | ........... | 252/586 |
| 2009/0135349 A1 * | 5/2009 | Shibatani et al. | ........... | 349/106 |
| 2009/0296248 A1 * | 12/2009 | Gotoh | ........... | 359/891 |
| 2010/0051951 A1 * | 3/2010 | Lee et al. | ........... | 257/59 |
| 2011/0041876 A1 * | 2/2011 | Lee et al. | ........... | 134/13 |

FOREIGN PATENT DOCUMENTS

| | | | |
|---|---|---|---|
| JP | 2005-010816 A | | 1/2005 |
| JP | 2005-189679 A | | 7/2005 |
| JP | 2006-154752 A | | 6/2006 |
| KR | 1020010073931 A | | 8/2001 |
| KR | 1020040098817 A | | 11/2004 |
| KR | 102005006980 A | | 1/2005 |
| KR | 100742122 B1 | | 7/2007 |
| KR | 1020080046450 A | | 5/2008 |
| KR | 1020090019299 A | | 2/2009 |

* cited by examiner

*Primary Examiner* — Gregory E. Webb

(74) *Attorney, Agent, or Firm* — Innovation Counsel LLP

(57) ABSTRACT

A composition for stripping a color filter and a color filter regeneration method are provided. A composition for stripping the color filter according to an exemplary embodiment of the present invention includes glycol and potassium hydroxide (KOH), in which either (a) the concentration of the glycol is in the range of 83 wt % to 91 wt % and of the concentration of the potassium hydroxide satisfies the condition: (wt % of KOH)≧6−(0.065*(wt % of the glycol)), or (b) the concentration of glycol is more than 91 wt % and the concentration of potassium hydroxide (KOH) is more than 0.2 wt %.

26 Claims, 13 Drawing Sheets

12
COMPOSITION FOR STRIPPING COLOR FILTER AND REGENERATION METHOD OF COLOR FILTER USING THE SAME

CROSS-REFERENCE TO RELATED APPLICATION

This application claims priority to and the benefit of Korean Patent Application No. 10-2009-0076403 filed in the Korean Intellectual Property Office on Aug. 18, 2009, the entire contents of which are incorporated herein by reference.

BACKGROUND OF THE INVENTION (a) Field of the Invention

The present invention relates to a composition for stripping a color filter, and a method for regenerating a color filter using the same.

(b) Description of the Related Art

A color filter for a liquid crystal display typically includes a black matrix formed on a substrate, and a color resist (e.g., a red, green, and blue pattern) enclosed by the black matrix.

To form the color resist, pigment dispersion, dyeing, electrochemical deposition, and Inkjet printing methods are mainly used. Among such methods, the pigment dispersion method is the most widely used. The pigment dispersion method uses a color resist composition in which pigments are dispersed in a light hardening resin composition, thereby achieving minute patterns. However, when using the method for high color reproducibility and on substrates of a large size, such as TVs, problems such as stains are created in the coating and developing stages of the method, such that management of the process is difficult. As a result of such problems, research is also being conducted on the Inkjet printing method, to make Inkjet printing more appropriate for mass production and to simplify manufacturing processes using the method. However, when the color filter is manufactured using the Inkjet printing method, problems such as partial lifting of the pattern, line width expansion, and misalignment with the black matrix may occur, and, in the case of misalignment, it is often not feasible for only the misaligned portion of a previously hardened color resist to be selectively removed.

When defects in the color filter occur, the glass substrate, including the color filter, is either wasted or is regenerated for further usage. For regeneration of the substrate, the color filter must be removed. Conventionally, the color filter is removed by use of a strong alkali, such as KOH and TMAH. The conventional removal methods, however, reduce the thickness of the black matrix and/or increase the surface roughness in the process of stripping the color filter.

The above information disclosed in this Background section is only for enhancement of understanding of the background of the invention and therefore it may contain information that does not form the prior art that is already known to a person of ordinary skill in the art.

SUMMARY OF THE INVENTION

The present invention relates to a composition and method for selectively removing a defective color filter without causing damage to a partition or a light blocking member.

In one aspect, a composition for stripping a color filter includes glycol and potassium hydroxide (KOH), and the concentration of the glycol is in the range of 83 wt % to 91 wt %, and the concentration of the potassium hydroxide satisfies the condition: (wt % of KOH)≧6−(0.065*wt % of the glycol).

The composition for stripping the color filter may be manufactured at a temperature in the range of 20 degrees Celsius to 30 degrees Celsius.

The composition for stripping the color filter may include one of a polar solvent, an amine, and an inorganic solvent.

The glycol may include one of diethylene glycol monobutyl ether, diethylene glycol monoethyl ether, and ethylene glycol monoethyl ether.

In another aspect, a composition for stripping the color filter includes glycol and potassium hydroxide (KOH), wherein the concentration of glycol is more than 91 wt % and the concentration of potassium hydroxide (KOH) is more than 0.2 wt %.

The composition for stripping the color filter may be manufactured at a temperature in the range of 20 degrees Celsius to 30 degrees Celsius.

The composition for stripping the color filter may include one of a polar solvent, an amine, and an inorganic solvent.

The glycol may include one of diethylene glycol monobutyl ether, diethylene glycol monoethyl ether, and ethylene glycol monoethyl ether.

A color filter regeneration method includes: forming a partition on a substrate; forming a first color filter filling within the partition; and removing the first color filter with a composition for stripping a color filter including glycol and potassium hydroxide (KOH), in which either (a) the concentration of the glycol is in the range of 83 wt % to 91 wt % and the concentration of the potassium hydroxide satisfies the condition (wt % of KOH)≧6−(0.065*(wt % of the glycol)), or (b) the concentration of glycol is more than 91 wt % and the concentration of potassium hydroxide (KOH) is more than 0.2 wt %.

The first color filter may be removed at a temperature in the range of 20 degrees Celsius to 30 degrees Celsius.

The composition for stripping the color filter may be manufactured at a temperature in the range of 20 degrees Celsius to 30 degrees Celsius.

The method may further include, after forming the first color filter, natural drying or baking at a temperature of less than 150 degrees Celsius.

The first color filter may be formed through an Inkjet printing method after forming the partition.

The method may further include forming a second color filter within the partition by using the Inkjet printing method without the removal of the partition after removing the first color filter.

The method may further include plasma-treating the partition before forming the second color filter.

The method may further include plasma-treating the partition after forming the partition.

The partition may function as a light blocking member.

The partition may be an organic layer or a transparent organic layer.

In one aspect, when manufacturing the color filter by using an inkjet printing method, in the case that a misprint or stains are generated, the color filter may be selectively removed without damage to the partition or the light blocking member.

DETAILED DESCRIPTION OF THE EMBODIMENTS

Figure 1:
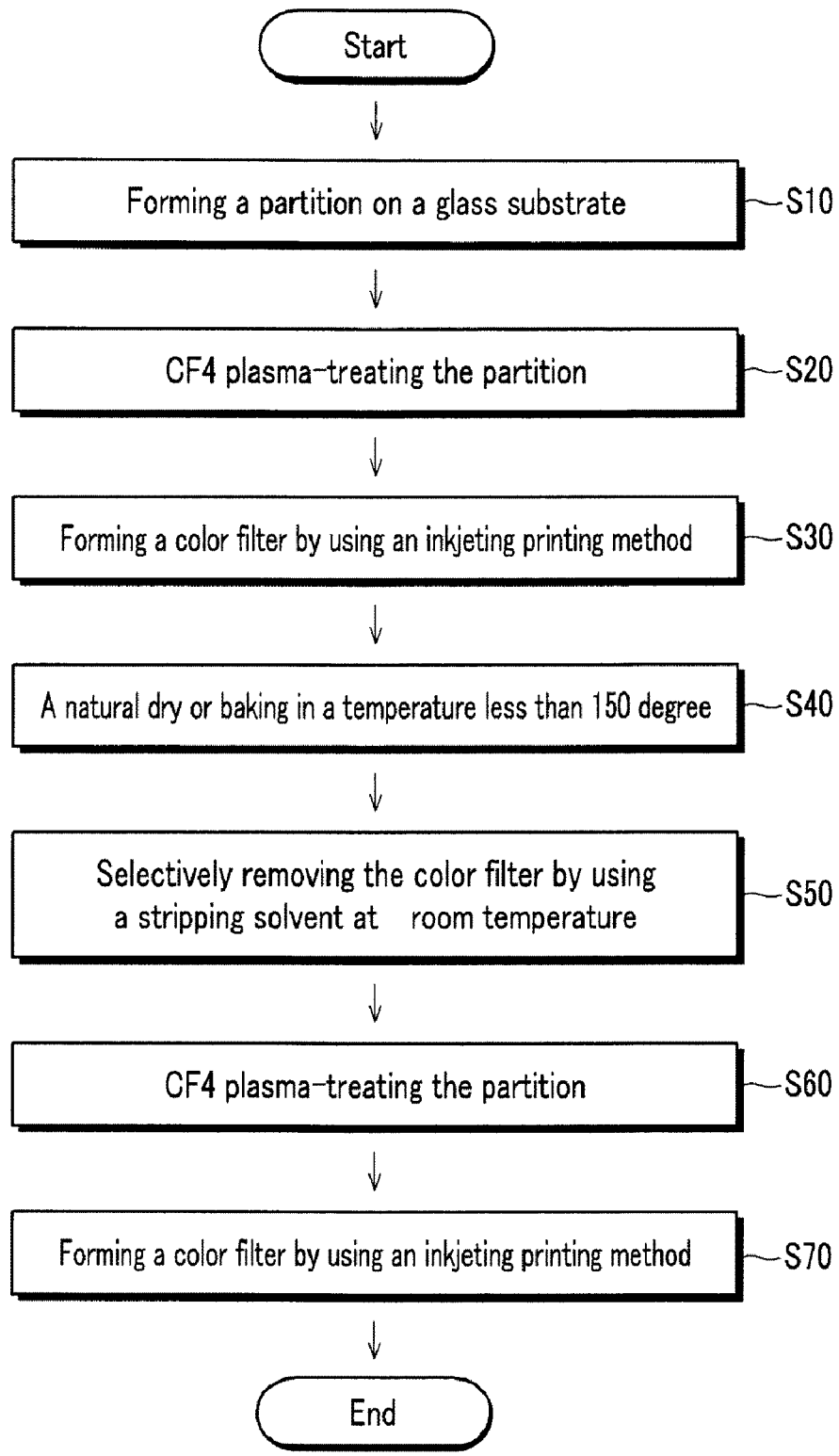
FIG. 1 is a flowchart illustrating a color filter regeneration method using a composition for stripping a color filter according to an exemplary embodiment.

The present invention will be described more fully hereinafter with reference to the accompanying drawings, in which exemplary embodiments are shown. However, the present invention is not limited to the exemplary embodiments described herein, and may be embodied in other forms.

In the drawings, the thicknesses of layers and regions are exaggerated for clarity. It is to be noted that when a layer is referred to as being "on" another layer or substrate, it can be directly formed on the other layer or substrate or can be formed on the other layer or substrate with a third layer interposed therebetween. Like constituent elements are denoted by like reference numerals throughout the specification.

A composition for stripping a color filter according to an exemplary embodiment includes glycol and potassium hydroxide (KOH), in which either (a) the glycol concentration is in the range of 83 wt % to 91 wt % and the potassium hydroxide concentration satisfies the condition: (wt % of KOH)$\geq$6–(0.065*(wt % of the glycol)), or (b) the glycol concentration is over 91 wt % and the concentration of the potassium hydroxide (KOH) is more than 0.2 wt %.

When the glycol and potassium hydroxide composition for stripping a color filter is used to strip a color filter that was formed by the Inkjet printing method, damage to the light blocking member (black matrix) may be minimized. Also, the amount of color filter remaining after stripping process may be reduced.

The glycol may include at least one of diethylene glycol monobutyl ether, diethylene glycol monoethyl ether, and ethylene glycol monoethyl ether.

The composition for stripping the color filter may include at least one of a polarity solvent, an amine, and an inorganic solvent.

The composition for stripping the color filter may be manufactured at a temperature in the range of 20 degrees Celsius to 30 degrees Celsius.

Figure 2:
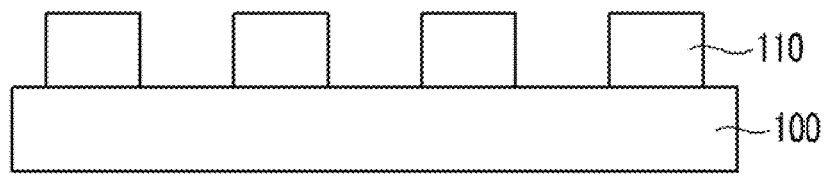
FIG. 2 to FIG. 4 are cross-sectional views illustrating a color filter regeneration method using a composition for stripping a color filter according to an exemplary embodiment.
Figure 3:
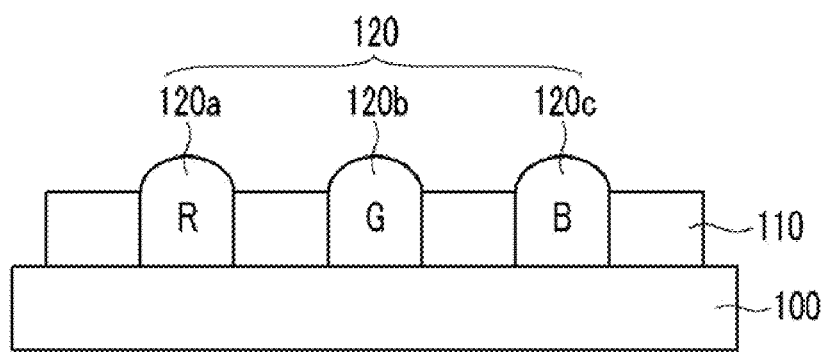
Figure 4:
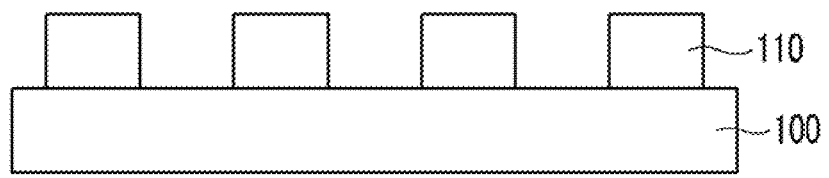

FIG. 1 is a flowchart illustrating a color filter regeneration method using a composition for stripping the color filter according to an exemplary embodiment. FIG. 2 to FIG. 4 are cross-sectional views illustrating a color filter regeneration method using a composition for stripping the color filter according to an exemplary embodiment.

A method for regeneration of a color filter using the above-described composition for stripping the color filter will be described with reference to FIG. 1 to FIG. 4.

As shown in FIG. 2, a partition 110 is formed on an insulation substrate 100 made of transparent glass or plastic (S10 in FIG. 1). The partition 110 may have, for example, a lattice shape on the insulation substrate 100. The partition 110 may be formed from an organic layer or a transparent organic layer. The partition 110 functions as a light blocking member (e.g., a black matrix), preventing light leakage.

Before forming the partition 110, wiring such as gate lines, data lines, and thin film transistors may be formed on the insulation substrate 100.

The partition 110 is typically plasma-treated by using CF4 (S20 in FIG. 1) to provide hydrophobicity to the partition 110.

Next, as shown in FIG. 3, a first color filter 120 is formed so that the color filter 120 fills spaces formed within partition 110 (S30 of FIG. 1). The first color filter 120 may be formed by using the Inkjet printing method. The first color filter 120 includes, for example, a red color filter 120a, a green color filter 120b, and a blue color filter 120c.

The first color filter 120 may be dried naturally, without additional heating, i.e., under ambient conditions at approximately room temperature (referred to herein as "natural drying") or may be dried by baking at a temperature of less than 150 degrees Celsius (S40 of FIG. 1).

In the natural drying method, the first color filter 120 may be left as it is, after being formed, for about 10 minutes to about 300 minutes, more particularly, for about 60 minutes, without the need for baking.

The baking method may be executed at a particular temperature, for example, 110 degrees Celsius, for a particular time, for example 90 seconds.

When forming the color filter within the partition 110 by using the Inkjet printing method, defects may occur, for instance, the color filter may be formed at an undesired position, or stains due to particles may be created. When defects occur in the color filter, as described above, the color filter is removed by using the color filter stripping solvent according to an exemplary embodiment, and then it may be formed again.

According to an exemplary embodiment, as shown in FIG. 4, when the color filter is defective and needs to be removed, the first color filter 120 is selectively removed at room temperature by using the stripping solvent (S50 of FIG. 1), so that only the color filter 120 is removed, but, for instance, the a partition 110 and insulation substrate 100 remain The stripping solvent includes glycol and potassium hydroxide (KOH), and uses a composition for stripping the color filter in which either the glycol concentration is in the range of 83 wt % to 91 wt % and the concentration of the potassium hydroxide satisfies the condition: (wt % of KOH) $\geq$6–(0.065*(wt % of the glycol)), or the glycol concentration is more than 91 wt % and the concentration of the potassium hydroxide (KOH) is more than 0.2 wt %.

Here, "room temperature" may mean a temperature in the range of 20 degrees Celsius to 30 degrees Celsius. The room temperature of about 25 degrees Celsius, for example, may be appropriate. As stated above, when the first color filter 120 is removed at room temperature (in the range of 20 degrees Celsius to 30 degrees Celsius) using the composition for removing the color filter according to an exemplary embodiment, damage to the partition 110 may be minimized.

If the first color filter 120 is removed by using the stripping solvent at room temperature, only the insulation substrate 100 and the partition 110 remain. In the conventional high temperature color filter stripping method, only the insulation substrate 100 remains, while the first color filter 120 and the partition 110 are both removed, or the thickness of the partition 110 is decreased and the roughness of the surface is increased in the removal process. However, when using the stripping solvent and the method according to an exemplary embodiment, only the first color filter 120 is removed, and it is removed without damaging the partition 110.

Next, the partition 110 is again plasma-treated by using CF4 (S60 in FIG. 1).

Next, the second color filter (not shown) is formed by using the Inkjet printing method (S70 in FIG. 1).

After forming the second color filter, an overcoat (not shown) covering the partition 110 and the second color filter may be formed.

The effects of using the composition for stripping the color filter according to an exemplary embodiment will now be described.

Figure 5A:
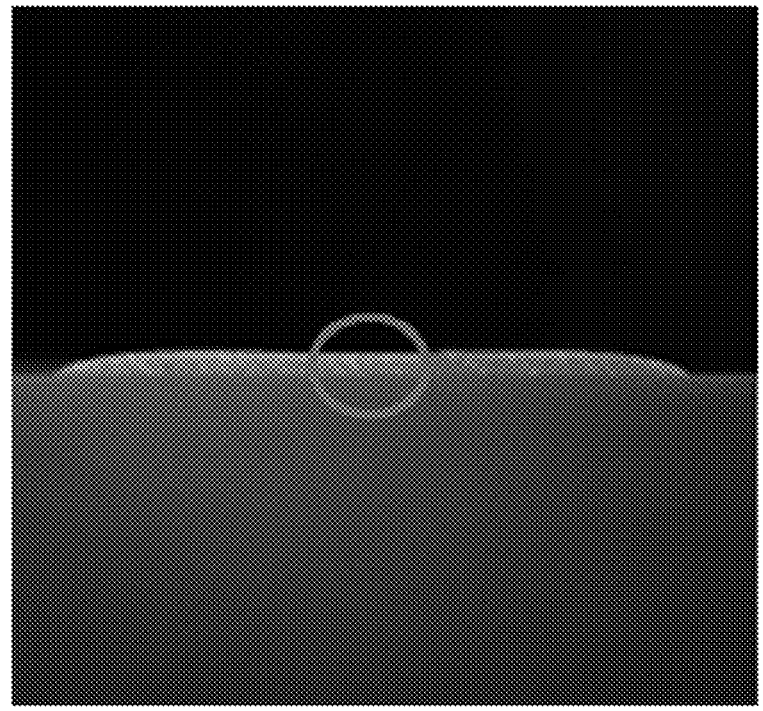
FIG. 5A, 5B and FIG. 6 are SEM (scanning electron microscope) photographs before and after removing the color filter using a composition for stripping a color filter according to an exemplary embodiment.
Figure 5B:
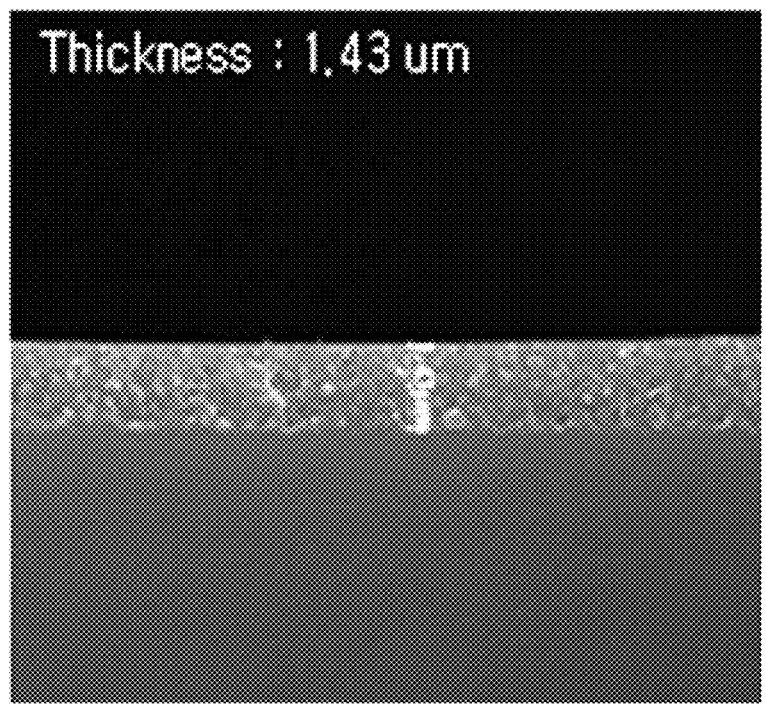
Figure 6:
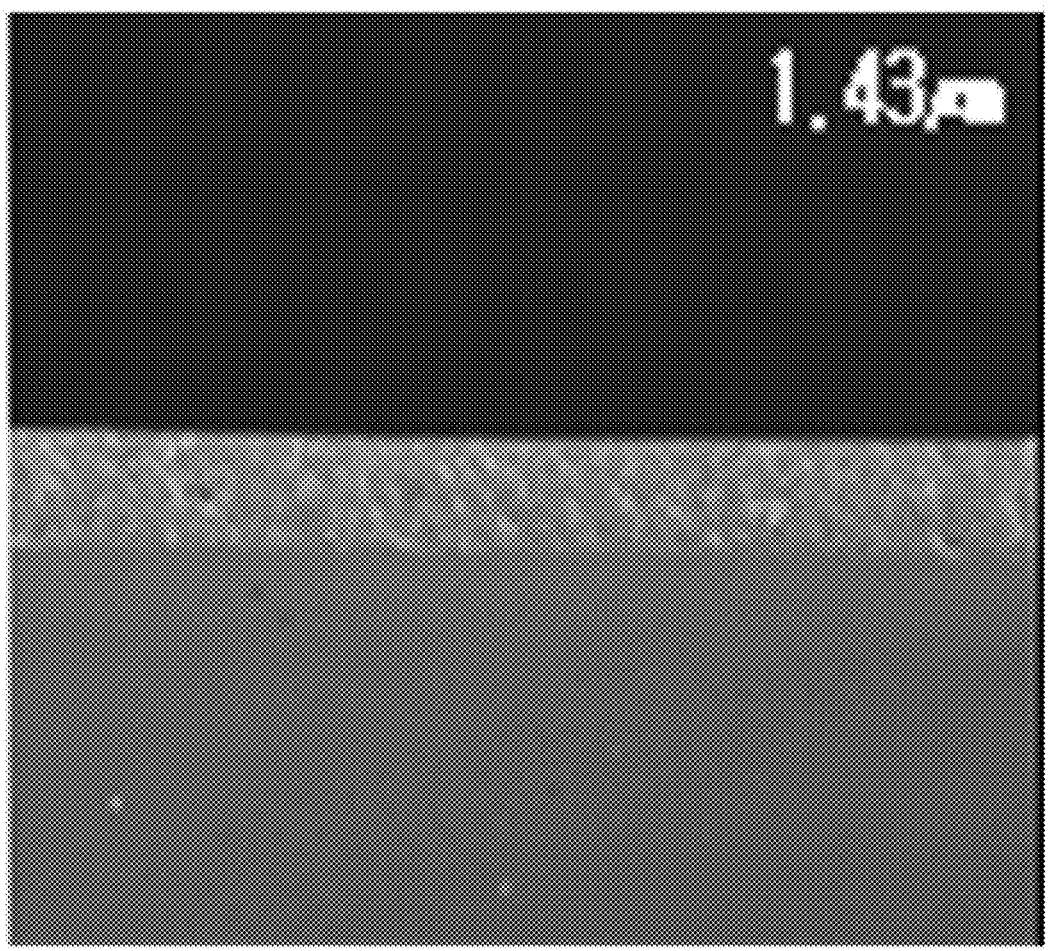

FIG. 5A, 5B and FIG. 6 are SEM pictures taken before and after removing the color filter by using a composition for stripping a color filter according to an exemplary embodiment.

FIGS. 5A and 5B show the thickness of the partition before removing the color filter. FIG. 5B is an enlarged photograph of FIG. 5A. FIG. 6 is a photograph of the partition after removing the color filter, and shows that the thickness of the partition after removing the color filter is very similar to the thickness of the partition before removing the color filter. If the thickness of the partition is decreased after stripping the color filter g, an overflow may occur when reforming the color filter.

Exemplary Embodiment 1

A stripping solvent including more than 0.4 wt % potassium hydroxide (KOH) and more than 91 wt % glycol was used at room temperature.

The following Table 1 is a comparison of the surface roughness of a black matrix that is used as a partition before and after stripping a color filter by using a composition for stripping a color filter according to an exemplary embodiment.

TABLE 1

| Surface roughness | Before stripping | After stripping |
| --- | --- | --- |
| Black matrix | 72.4 | 75.9 |
| | 68.7 | 84.7 |
| | 67.1 | 86.1 |
| | 73.2 | 82.6 |
| | 81.3 | 82.0 |
| Average | 72.5 | 82.3 |

According to five tests, the average roughness was 72.5 Å before the stripping of the color filter, and the average roughness was 82.3 Å after the stripping of the color filter, such that the surface roughness increased by an average of 9.8 Å. This means that the damage caused to the black matrix is in a very small range when stripping the color filter using the composition for stripping a color filter according an exemplary embodiment.

The following Table 2 shows an average contact angle after a plasma treatment when four different compositions for a stripping solvent are used. Each stripping solvent commonly includes the glycol at a concentration of 91 wt %, and, respectively, (1) 0.2 wt of KOH %, (2) 2 wt % of MAH, (3) PGMEA, or (4) LGL. The "contact angle" means an angle formed by the upper surface of the black matrix and the side surface of the color filter. If the contact angle is very small, overflow of the color filter may occur.

TABLE 2

| Contact angle average after a plasma retreatment | Example 1 | Example 2 |
| --- | --- | --- |
| (1) KOH 0.4 wt % | 59.0 | 59.9 |
| (2) MAH 2 wt % | 58.5 | 58.0 |
| (3) PGMEA | 58.9 | 56.4 |
| (4) LGL | 55.0 | 55.9 |

Before stripping the color filter, the average contact angle was about 58 degrees. When the stripping composition includes 0.4 wt % of potassium hydroxide (KOH) and 91 wt % of glycol (composition (1)), the contact angles respectively were 59 degrees and 59.9 degrees for the two example samples tested. These contact angles were somewhat increased compared to the average contact angle of about 58 degrees before stripping, and there is little change in contact angle between the two tests.

When using 2 wt % of tetramethyl ammonium hydroxide (TMAH) and 91 wt % of glycol (composition (2)), the average contact angle result is similar to the result before the stripping. However, when using propylene glycol monomethyl ether acetate (PGMEA) (composition (3)), results of 58.9 degrees and 56.4 degrees were measured in two tests, and the difference between the results of the two tests demonstrates the problem of reproductivity with this composition.

When using the organic cleansing (LGL) (composition (4)), the contact angles were 55.0 degrees and 55.9 degrees, which are decreased as compared to before the stripping.

Figure 7:
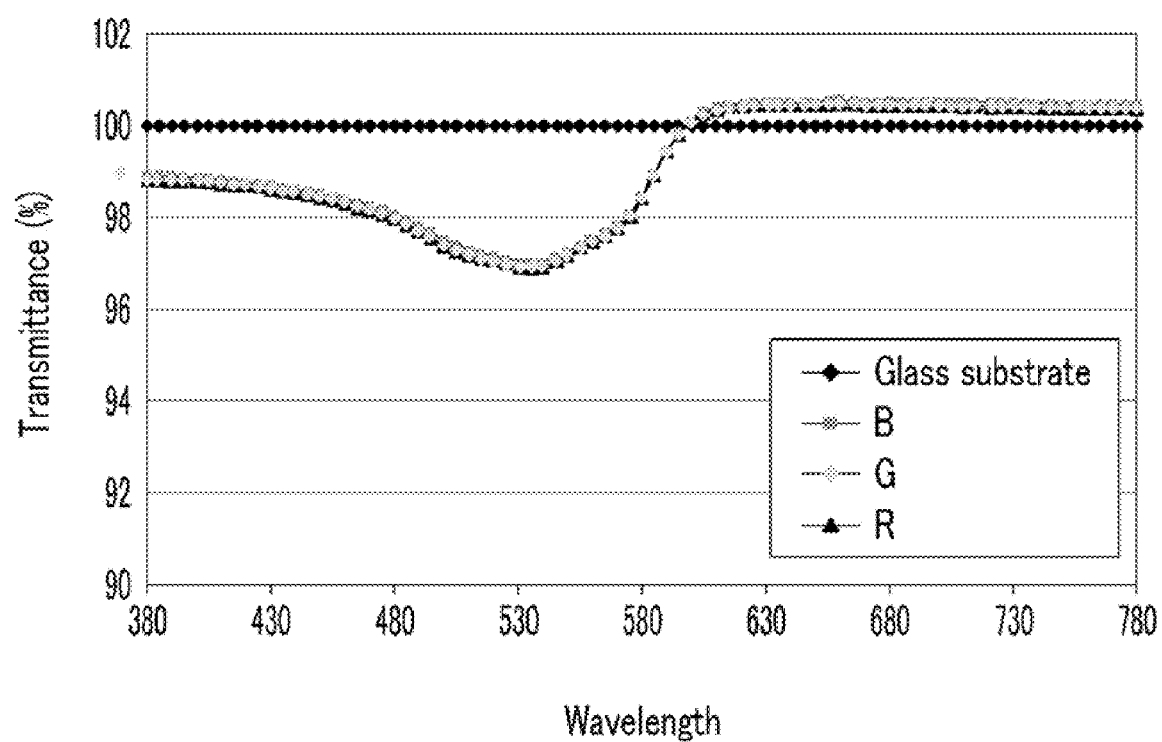
FIG. 7 is a graph showing transmittance of a color filter region after using a conventional stripping solvent.

FIG. 7 is a graph which shows transmittance of a color filter region after using a conventional stripping solvent.

FIG. 7 shows the transmittance of the glass substrate after stripping the color filter by using the conventional stripping solvent. When the glass substrate is new, the transmittance is 100%.

When the color filter has been stripped by using the conventional stripping solvent, the transmittance for a short wavelength is low.

Figure 8:
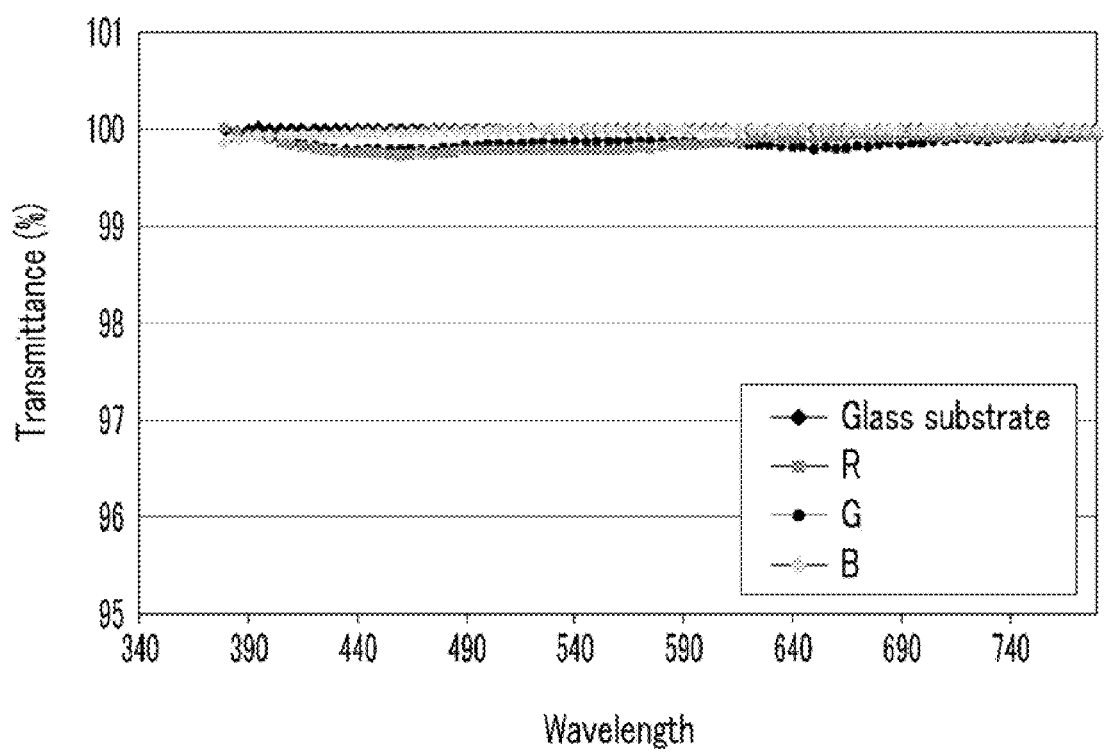
FIG. 8 is a graph which showing the transmittance of a color filter region after using a stripping method according to an exemplary embodiment.

FIG. 8 is a graph which shows the transmittance of a color filter region after using a new stripping method according to an exemplary embodiment.

Compared with the case in which the color filter remains when using the conventional stripping solvent, when using the stripping solvent according to the exemplary embodiment, the transmittance after removing the color filter is the same as that of a bare substrate.

Figure 9:
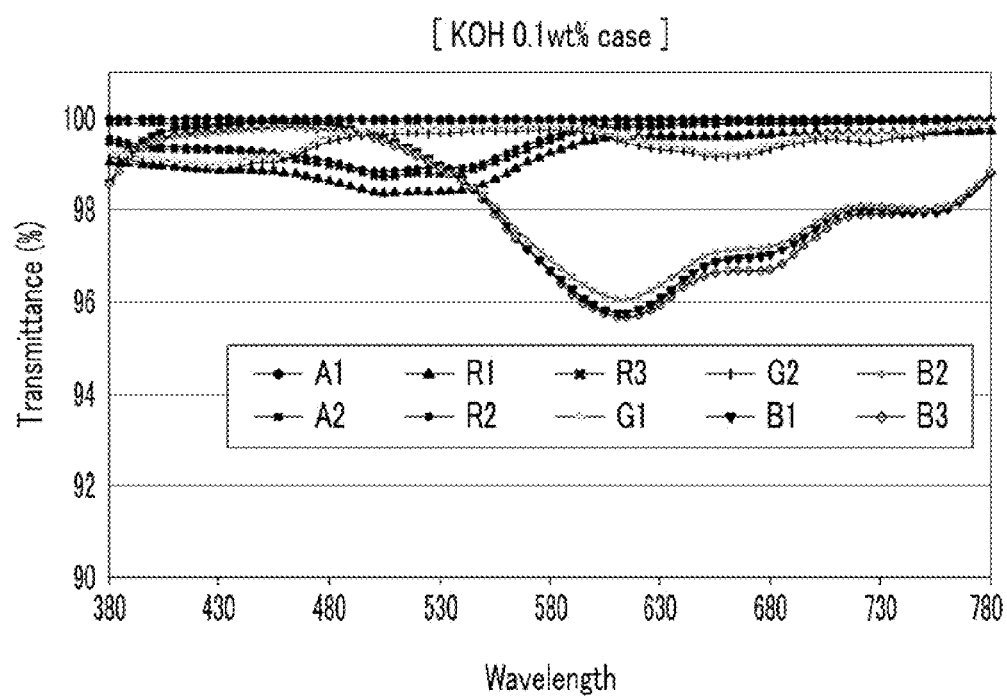
FIG. 9 to FIG. 11 are graphs showing the change in transmittance as the concentration of KOH in the composition for stripping a color filter according to an exemplary embodiment is varried.
Figure 10:
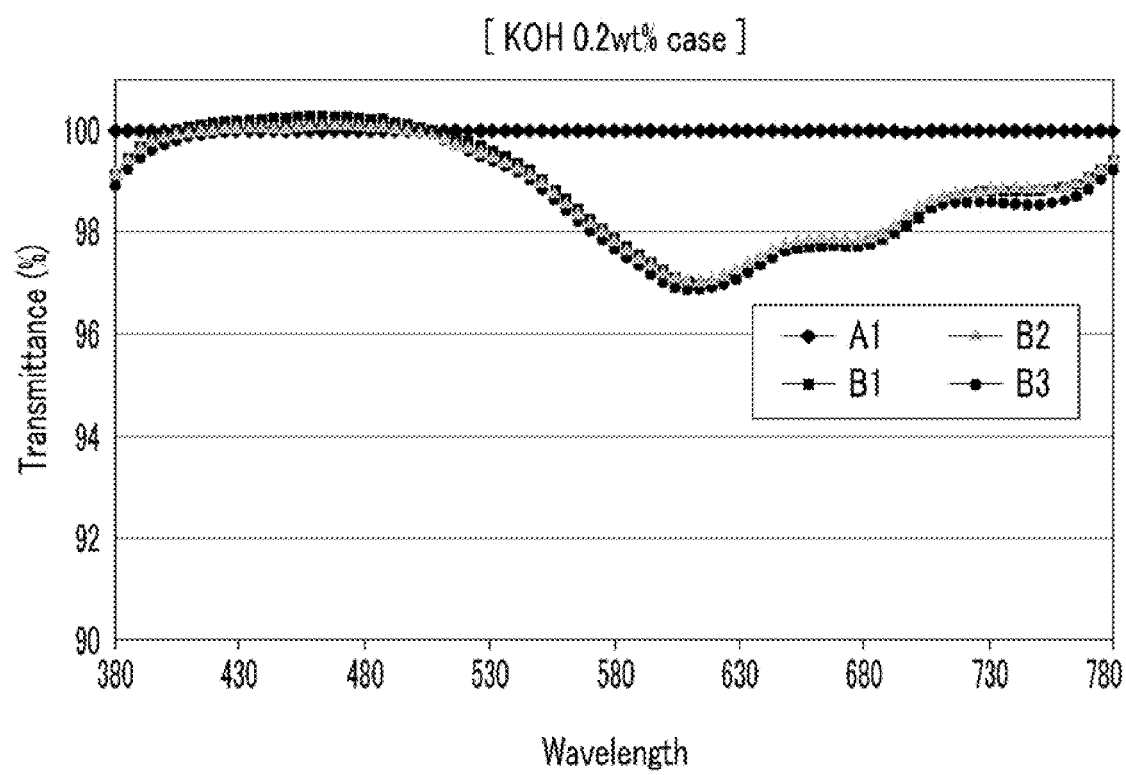
Figure 11:
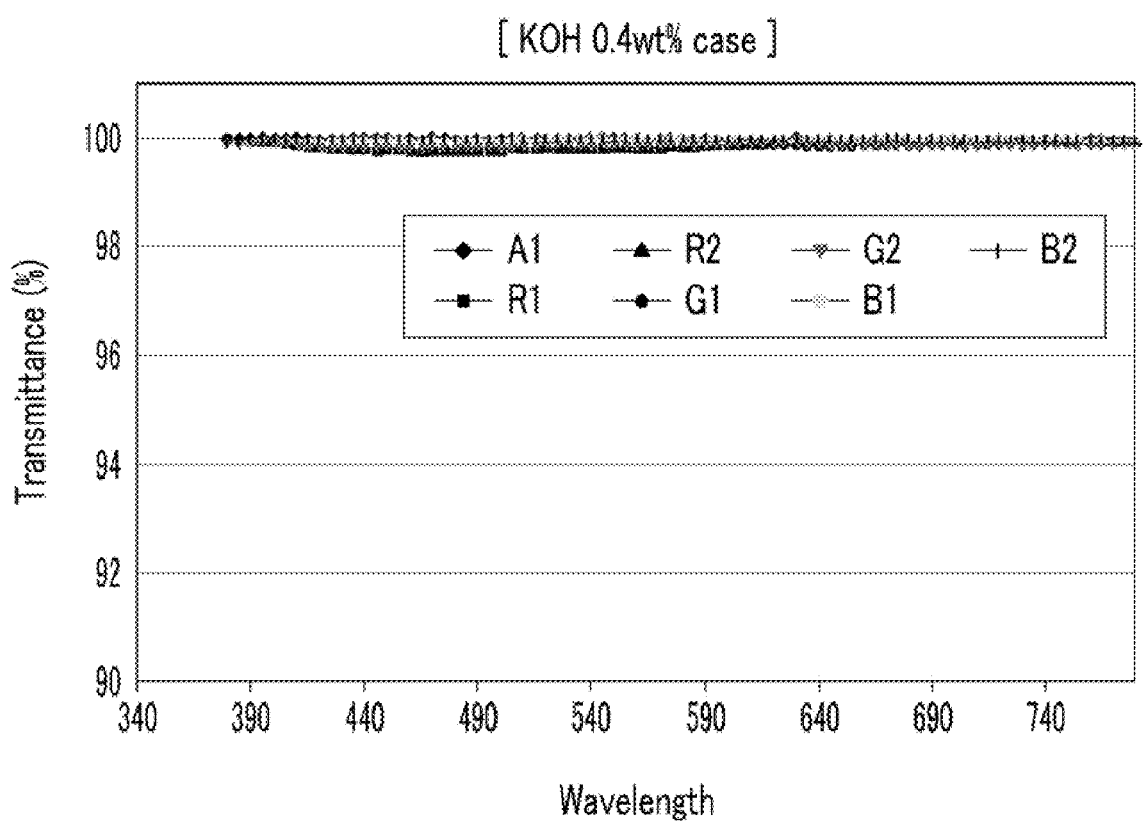

Next, experimental examples of removing a color filter using the stripping solvent according to the embodiments having different concentrations of potassium hydroxide will be described. FIG. 9 to FIG. 11 are graphs showing a transmittance change of the glass substrate and color filter regions after stripping the color filter as the concentration of KOH in the composition for stripping a color filter according to an exemplary embodiment is varried.

Experimental Example 1

In Experimental Example 1, the concentrations of potassium hydroxide were about 0.1 wt %, about 0.2 wt %, and about 0.4 wt %. Also, a color filter was formed through an Inkjet printing method, naturally dried for about 60 minutes, and removed at room temperature. Also, 91 wt % of Carbitol as a glycol was included in the stripping solvent.

FIG. 9 shows the transmittance of the glass substrate and color filter regions after use of the stripping solvent having 0.1 wt % of KOH. When the transmittance of the bare glass substrates A1 and A2 was about 100%, the transmittance of the red color filter regions R1, R2, and R3, the green color filter regions G1 and G2, and the blue color filter regions B1, B2, and B3 were about 96% to 99%. Particularly, the remaining amount of the blue color filter is large such that the transmittance of the blue color filter regions B1, B2, and B3 were decreased.

FIG. 10 shows transmittance of blue color filter regions B1, B2, and B3 after use of the stripping solvent having 0.2 wt % of KOH. In the case of the short wavelength region, the transmittance is close to 100%, however in the case of wavelengths greater than 530 nm, the transmittance is in the range of 97% to 99%.

FIG. 11 shows the transmittance of the color filter regions after use of the stripping solvent having 0.4 wt % of KOH. The transmittance of most of the red color filter regions R1 and R2, green color filter regions G1 and G2, and blue color filter regions B1 and B2 were close to 100%.

As a result, when KOH is present in the stripping solvent composition at a concentration greater than 0.4 wt %, the results of the experiment confirm that the color filter is completely removed.

Figure 12:
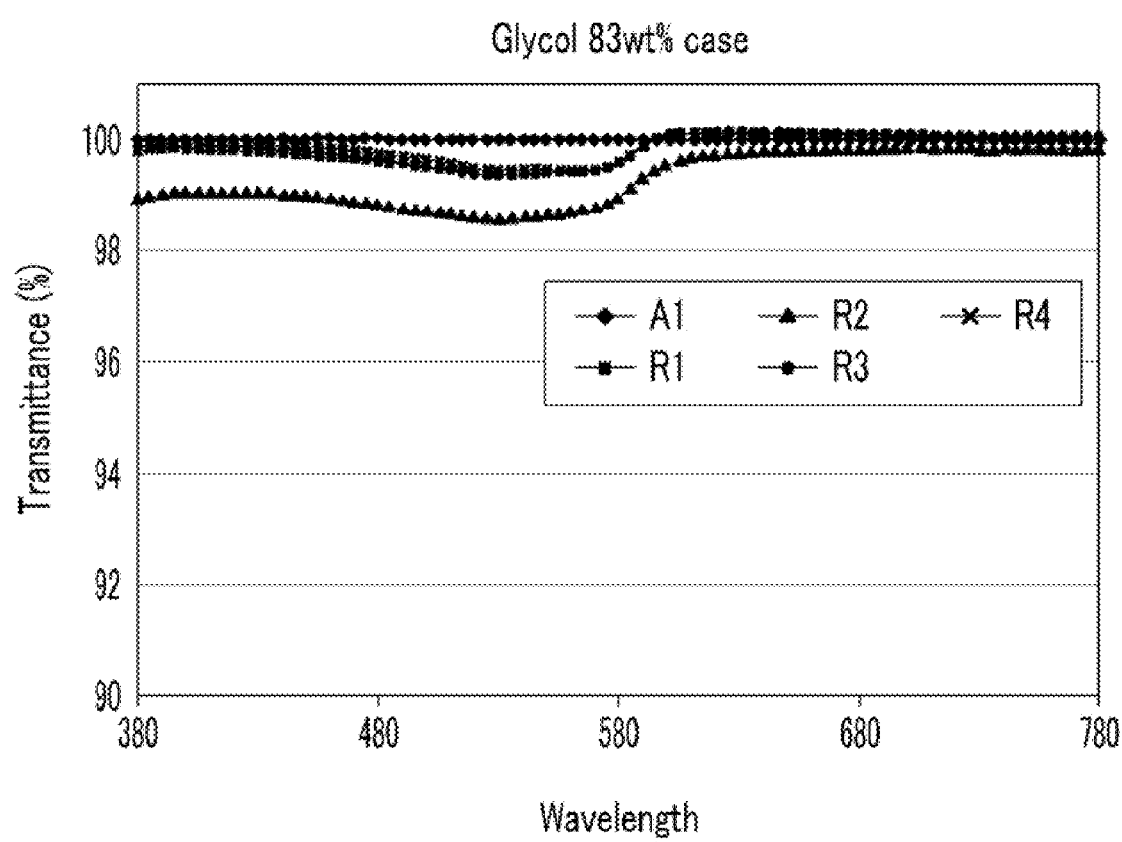
FIG. 12 to FIG. 14 are graphs showing the change in transmittance as the concentration of glycol in the composition for stripping a color filter according to an exemplary embodiment is varried.
Figure 13:
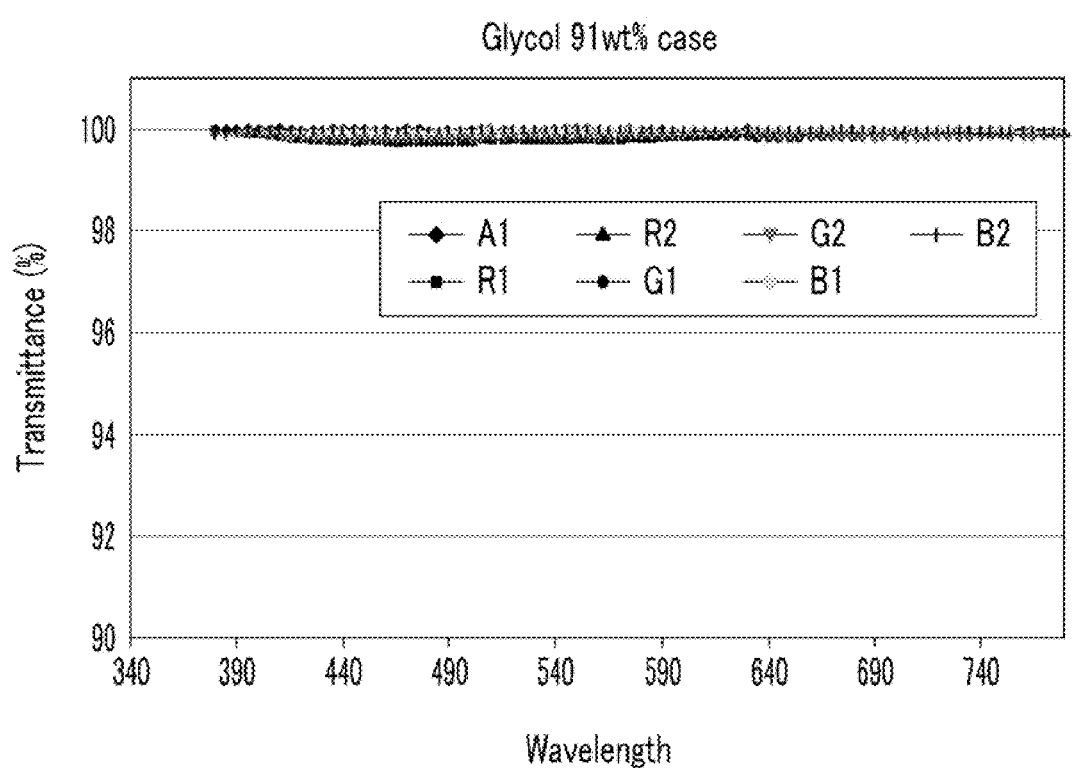
Figure 14:
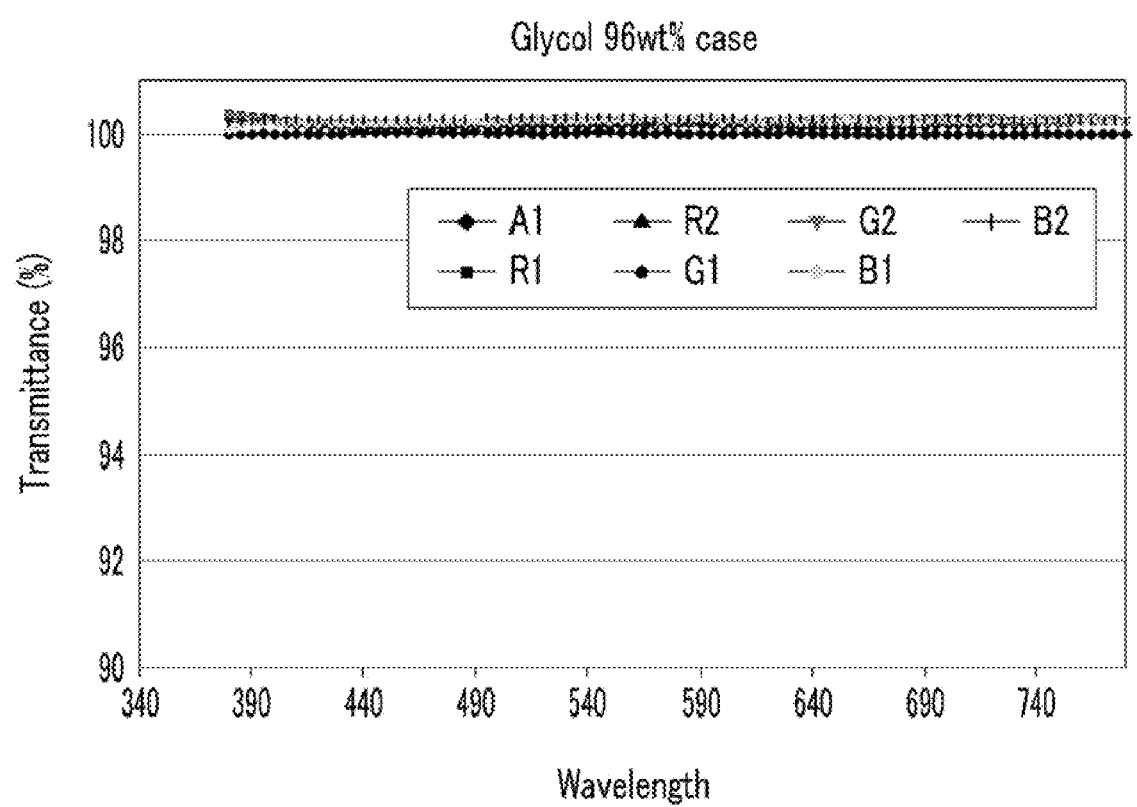

Next, experimental examples of removing a color filter using the stripping solvent according to the embodiments having different concentrations of glycol will be described. FIG. 12 to FIG. 14 are graphs showing a transmittance change of the glass substrate and color filter regions after stripping the color filter as the concentration of glycol in the composition for stripping a color filter according to an exemplary embodiment is varried.

Experimental Example 2

In, Experimental Example 2, the transmittance of the glass substrate and color filter regions was measured after stripping the color filter using three different compositions: (a) 0.7 wt % of potassium hydroxide and 83 wt % of glycol; (b) 0.4 wt % of potassium hydroxide and 91 wt % of glycol; and (c) 0.2 wt % of potassium hydroxide and 96 wt % of glycol. Also, the color filter was formed through the Inkjet printing method and naturally dried for about 60 minutes, and was removed at room temperature.

FIG. 12 shows transmittance of red color filter regions R1, R2, and R3 after stripping the color filter using composition (a): 0.7 wt % of potassium hydroxide and 83 wt % of glycol. In the short wavelength region, the transmittance of the color filter is particularly decreased.

FIG. 13 shows a transmittance of the color filter regions after stripping the color filter using composition (b): 0.4 wt % of potassium hydroxide and 91 wt % of glycol. The transmittance of most of the red color filter regions R1 and R2, green color filter regions G1 and G2, and blue color filter regions B1 and B2 were close to 100%.

FIG. 14 shows transmittance of the color filter regions after stripping the color filter using composition (c): 0.2 wt % of potassium hydroxide and 96 wt % of glycol. The transmittance of most of the red color filter regions R1 and R2, green color filter regions G1 and G2, and blue color filter regions B1 and B2 was close to 100%.

Figure 15:
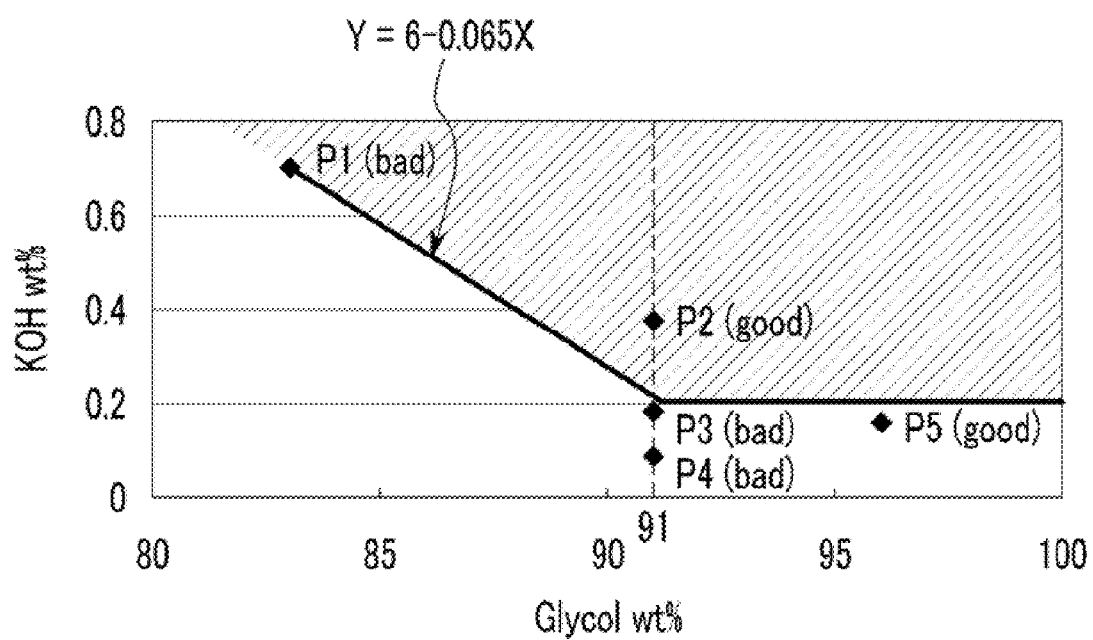
FIG. 15 is a graph showing a concentration relationship of KOH and glycol in the composition for stripping a color filter according to an exemplary embodiment.

FIG. 15 shows the results of Experimental Examples 1 and 2 compiled in a single graph.

The X-axis is the wt % of glycol, the Y-axis is the wt % of potassium hydroxide (KOH), and the slashed region shows concentrations for compositions of a color filter stripping solvent according to an exemplary embodiment.

In the region of the graph in which the glycol concentration is between 83 wt % and 91 wt %, the concentration of the potassium hydroxide (KOH) satisfies the condition (KOH wt %)$\geq 6-(0.065*(\text{glycol wt \%}))$.

In the region of the graph in which the glycol concentration is 91 wt % or more, the concentration of potassium hydroxide (KOH) satisfies the condition KOH wt %>0.2 wt %.

The composition for stripping the color filter and the color filter regeneration method according to an exemplary embodiment may be applied to an upper substrate of a liquid crystal display.

A liquid crystal display (LCD) is one of the most widely used flat panel displays (FPD), and it is composed of two display panels on which electrodes are formed, and a liquid crystal layer interposed between the two display panels. A voltage is applied to the electrodes to generate an electric field on the liquid crystal layer, the electric field alters the orientation of liquid crystal molecules in the liquid crystal layer, and thus light incident on the display panels is polarized, through the generated electric field, to display an image.

Among the LCDs, an LCD having a structure in which field generating electrodes are respectively formed on two display panels is widely used. Among the two display panels, a plurality of pixel electrodes and thin film transistors are arranged in a matrix format on one display panel, color filters of red, green, and blue and a light blocking member are formed on the other display panel, and one common electrode covers the entire surface of the other display panel.

However, when the pixel electrodes and the color filters are formed on the different display panels, it can be difficult to correctly align the pixel electrodes and the color filters, and an alignment error may result.

To solve this problem, a color filter on array (COA) structure in which the pixel electrodes and the color filters are formed on the same display panel is provided.

When forming the color filter on the same display panel with the thin film transistor, the color filter may be formed through the Inkjet printing method. In the Inkjet printing method, liquid ink that will form the color filter is sprayed (jetted) to predetermined divided portions on the display panel to implement each ink-colored filter. Using this method a plurality of colors, including red, green, and blue, can be formed at one time, such that the manufacturing process is simplified, which can considerably reduce manufacturing time and cost.

When the color filters are formed through inkjet printing, the ink may be injected into the desired region by using a partition, which has a role of preventing leakage of light at a boundary area of the pixels.

The composition for stripping the color filter and color filter regeneration method according to another exemplary embodiment may be applied to such a case in which the color filter is formed on the thin film transistor substrate (like the COA structure).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for regenerating a color filter comprising:
forming a partition on a substrate;
forming a first color filter filling within the partition; and
removing the first color filter with a composition for stripping a color filter including glycol and potassium hydroxide (KOH),
wherein either (a) the concentration of the glycol is in the range of 83 wt % to 91 wt % and the concentration of the potassium hydroxide satisfies the condition (wt % of KOH)$\geq 6-(0.065*$(wt % of the glycol)), or (b) the concentration of glycol is more than 91 wt % and the concentration of potassium hydroxide (KOH) is more than 0.2 wt %.

2. The method of claim 1, wherein
the first color filter is removed at a temperature in the range of 20 degrees Celsius to 30 degrees Celsius.

3. The method of claim 2, wherein
the composition for stripping the color filter is manufactured at a temperature in the range of 20 degrees Celsius to 30 degrees Celsius.

4. The method of claim 3, further comprising
after forming the first color filter, executing natural drying or baking at a temperature of less than 150 degrees Celsius.

5. The method of claim 4, wherein
the first color filter is formed through an Inkjet printing method after forming the partition.

6. The method of claim 5, further comprising
forming a second color filter within the partition by using the Inkjet printing method without the removal of the partition after removing the first color filter.

7. The method of claim 6, further comprising
plasma-treating the partition before forming the second color filter.

8. The method of claim 7, further comprising
plasma-treating the partition after forming the partition.

9. The method of claim 8, wherein
the partition functions as a light blocking member.

10. The method of claim 8, wherein
the partition is an organic layer or a transparent organic layer.

11. The method of claim 2, further comprising
after forming the first color filter, executing natural drying or baking at a temperature of less than 150 degrees Celsius.

12. The method of claim 2, wherein
the first color filter is formed through an Inkjet printing method after forming the partition.

13. The method of claim 12, further comprising
forming a second color filter within the partition by using the Inkjet printing method without the removal of the partition after removing the first color filter.

14. The method of claim 13, further comprising
plasma-treating the partition before forming the second color filter.

15. The method of claim 2, further comprising
forming a second color filter within the partition by using the Inkjet printing method without the removal of the partition after removing the first color filter.

16. The method of claim 15, further comprising
plasma-treating the partition before forming the second color filter.

17. The method of claim 1, wherein
the composition for stripping the color filter is manufactured at a temperature in the range of 20 degrees Celsius to 30 degrees Celsius.

18. The method of claim 17, wherein
the first color filter is formed through an Inkjet printing method after forming the partition.

19. The method of claim 18, further comprising
forming a second color filter within the partition by using the Inkjet printing method without the removal of the partition after removing the first color filter.

20. The method of claim 19, further comprising
plasma-treating the partition before forming the second color filter.

21. The method of claim 1, further comprising
after forming the first color filter, executing natural drying or baking at a temperature of less than 150 degrees Celsius.

22. The method of claim 1, wherein
the first color filter is formed through an Inkjet printing method after forming the partition.

23. The method of claim 22, further comprising
forming a second color filter within the partition by using the Inkjet printing method without the removal of the partition after removing the first color filter.

24. The method of claim 23, further comprising
plasma-treating the partition before forming the second color filter.

25. The method of claim 1, further comprising
forming a second color filter within the partition by using the Inkjet printing method without the removal of the partition after removing the first color filter.

26. The method of claim 25, further comprising
plasma-treating the partition before forming the second color filter.

* * * * *